United States Patent
Van Nieuwenhove

(10) Patent No.: US 11,828,849 B2
(45) Date of Patent: Nov. 28, 2023

(54) ILLUMINATION DEVICE, TIME OF FLIGHT SYSTEM AND METHOD

(71) Applicant: Sony Semiconductor Solutions Corporation, Kanagawa (JP)

(72) Inventor: Daniel Van Nieuwenhove, Hofstade (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 204 days.

(21) Appl. No.: 16/765,443

(22) PCT Filed: Nov. 28, 2018

(86) PCT No.: PCT/EP2018/082878
§ 371 (c)(1),
(2) Date: May 19, 2020

(87) PCT Pub. No.: WO2019/106033
PCT Pub. Date: Jun. 6, 2019

(65) Prior Publication Data
US 2020/0319309 A1    Oct. 8, 2020

(30) Foreign Application Priority Data
Nov. 28, 2017 (EP) .................................. 17204232

(51) Int. Cl.
*G01S 17/894* (2020.01)
*G01S 17/89* (2020.01)
*F21V 5/04* (2006.01)
*G01S 7/481* (2006.01)

(52) U.S. Cl.
CPC ................. *G01S 17/89* (2013.01); *F21V 5/04* (2013.01); *G01S 7/4815* (2013.01); *G01S 17/894* (2020.01)

(58) Field of Classification Search
CPC ...... G01S 17/89; G01S 7/4815; G01S 17/894; G01S 7/4814; F21V 5/04
See application file for complete search history.

(56) References Cited

U.S. PATENT DOCUMENTS

| 6,052,189 A | 4/2000 | Fuse et al. |
| 6,839,127 B1 | 1/2005 | Anderson |
| 8,761,594 B1 | 6/2014 | Gross et al. |
| 9,140,795 B2 | 9/2015 | Lehmann et al. |

(Continued)

FOREIGN PATENT DOCUMENTS

| CN | 105572926 A | 5/2016 |
| CN | 105629469 A | 6/2016 |

(Continued)

OTHER PUBLICATIONS

Description DE102016219518A1, English machine translation, 11 pages (Year: 2022).*

(Continued)

*Primary Examiner* — Tuyen K Vo
(74) *Attorney, Agent, or Firm* — Wolf, Greenfield & Sacks, P.C.

(57) ABSTRACT

An illumination device for time-of-flight detection has a light emitting unit for emitting a light ray pattern for generating a light pattern, and a lens portion for focusing the emitted light ray pattern at a predefined focal point at a predefined distance to the lens portion for generating the light pattern.

18 Claims, 3 Drawing Sheets

(56) References Cited

U.S. PATENT DOCUMENTS

| | | | |
|---|---|---|---|
| 2009/0201588 A1 | 8/2009 | Tanaka et al. | |
| 2009/0210193 A1* | 8/2009 | Nagase | F24F 11/30 250/208.2 |
| 2011/0156923 A1 | 6/2011 | Van Endert | |
| 2014/0049766 A1* | 2/2014 | Hudman | G02B 27/0927 356/5.01 |
| 2014/0303522 A1 | 10/2014 | Akimoto et al. | |
| 2014/0346334 A1 | 11/2014 | Grossinger | |
| 2015/0268333 A1 | 9/2015 | Schneider et al. | |
| 2015/0362585 A1 | 12/2015 | Ghosh et al. | |
| 2015/0377445 A1* | 12/2015 | Chuang | F21S 41/675 362/465 |
| 2016/0037094 A1* | 2/2016 | Chang | H04N 25/50 356/5.01 |
| 2016/0146927 A1* | 5/2016 | Hudman | G01S 7/4814 359/558 |
| 2016/0178358 A1 | 6/2016 | Miyasaka | |
| 2016/0178992 A1 | 6/2016 | Schneider | |
| 2016/0182788 A1 | 6/2016 | Wan et al. | |
| 2016/0182789 A1* | 6/2016 | Wan | G06T 7/521 348/370 |
| 2017/0068319 A1 | 3/2017 | Viswanathan | |
| 2017/0371029 A1* | 12/2017 | Axelsson | G01S 17/42 |
| 2018/0048880 A1* | 2/2018 | Trail | H04N 13/366 |
| 2018/0091784 A1* | 3/2018 | Dutton | H04N 9/315 |
| 2018/0188557 A1* | 7/2018 | Huang | G02B 27/0093 |
| 2018/0217234 A1* | 8/2018 | Skowronek | G01S 17/36 |
| 2018/0259646 A1* | 9/2018 | Rayer | G01S 17/89 |
| 2019/0011560 A1* | 1/2019 | Matsuura | G01S 7/4865 |

FOREIGN PATENT DOCUMENTS

| | | | |
|---|---|---|---|
| DE | 10 2016 219518 A1 | 5/2017 | |
| JP | 2008-209162 A | 9/2008 | |
| JP | 2010-271306 A | 12/2010 | |
| KR | 2014 0028536 A | 3/2014 | |
| KR | 2015 0089673 A | 8/2015 | |
| KR | 2016-0101312 A | 8/2016 | |
| WO | WO-2016172960 A1 | 11/2016 | |
| WO | WO-2017023208 A1 * | 2/2017 | G01S 17/32 |

OTHER PUBLICATIONS

International Search Report and Written Opinion in connection with International Application No. PCT/EP2018/082878 dated Feb. 22, 2019.

* cited by examiner

ILLUMINATION DEVICE, TIME OF FLIGHT SYSTEM AND METHOD

CROSS-REFERENCE TO RELATED APPLICATIONS

This application claims the benefit under 35 U.S.C. § 371 as a U.S. National Stage Entry of International Application No. PCT/EP2018/082878, filed in the European Patent Office as a Receiving Office on Nov. 28, 2018, which claims priority to European Patent Application 17204232.7, filed by the European Patent Office on Nov. 28, 2017, each of which is hereby incorporated by reference in its entirety.

TECHNICAL FIELD

The present disclosure generally pertains to an illumination device, a time of flight system, and a method for time of flight detection.

TECHNICAL BACKGROUND

Generally, time of flight (TOF) sensors are known, which are able, for example, to measure a distance between a light emitting element and a target, based on the roundtrip time of the emitted light.

Moreover, it is known that TOF relies on a diffuse projector and a TOF sensor calculating the time difference or phase difference to all points in a scene. The diffused light rapidly diminishes at longer distances and the dense number of rays may result in inter-reflections causing multipath and scatter.

It is also known to concentrate light in dots, grids, or other. Such structures are typically projected using an illumination source (laser/LED) and a diffractive optical element (DOE).

Although there exist techniques for time-of-flight detection, it is generally desirable to improve the time-of-flight detection.

SUMMARY

According to a first aspect, the disclosure provides an illumination device for time-of-flight detection, comprising a light emitting unit configured to emit a light ray pattern for generating a light pattern; and a lens portion configured to focus the emitted light ray pattern at a predefined focal point at a predefined distance to the lens portion for generating the light pattern.

According to a second aspect, the disclosure provides a time-of-flight system comprising an illumination device for time-of-flight detection, including a light emitting unit configured to emit a light ray pattern for generating a light pattern, and a lens configured to focus the emitted light ray pattern at a predefined focal point distant to the lens, and a time-of-flight sensor for detecting reflected light originating from the emitted light ray pattern.

According to a third aspect, the disclosure provides a method for time-of-flight detection, comprising emitting a light ray pattern through a lens portion, thereby generating a light pattern at a predefined focal point at a predefined distance to the lens portion; and detecting reflected light originating from the emitted light ray pattern.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
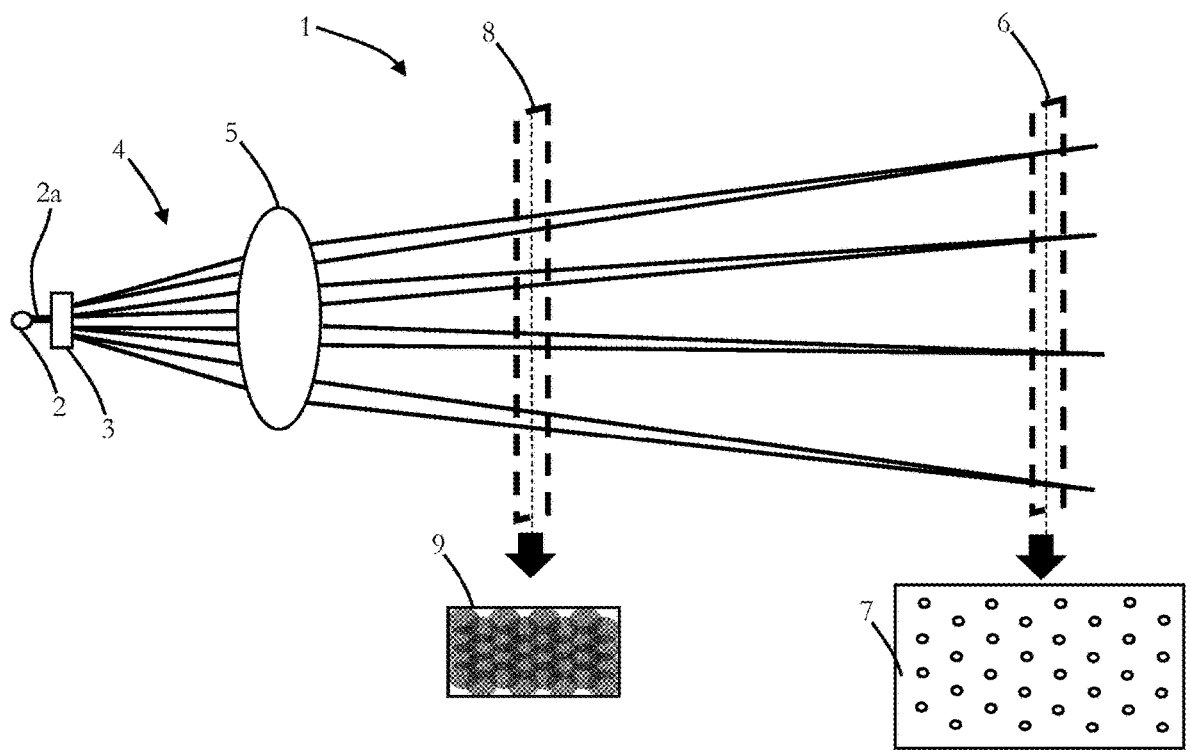
FIG. 1 illustrates a first embodiment of an illumination device for time-of-flight detection.

Before a detailed description of the embodiments under reference of FIG. 1 is given, general explanations are made.

As mentioned in the outset, it is known to concentrate light in dots, grids, or the like, wherein such structures may be projected using an illumination source (laser/led) and a diffractive optical element (DOE).

By using the generation of dots a longer distance can be measured, since the concentration of the light is larger resulting in a stronger signal at longer distance, which in turn improves the signal-to-noise ratio (SNR) and which also improves the sunlight resilience (the ratio of sunlight vs TOF Illumination is improved). However, the resolution is limited, since only information can be obtained where the structure or dots are projected and, additionally, due to the higher irradiance eye safety might not be ensured.

Accordingly, some of the embodiments pertain to an illumination device for time-of-flight detection, including a light emitting unit configured to emit a light ray pattern for generating a light pattern, and a lens portion configured to focus the emitted light ray pattern at a predefined focal point at a predefined distance to the lens portion for generating the light pattern.

By providing the lens portion, which focuses the emitted light ray pattern at the predefined focal point distant to the lens portion for generating the light pattern, a diffusion pattern is generated at a closer distance located between the lens portion and the focal point.

The light pattern may include multiple areas with high(er) light intensity and areas in between with low(er) light intensity (or no light intensity). The areas with high(er) light intensity may, generally, have any type of shape, e.g. linear, circular, elliptic, rectangular, any type of polygon, etc. The light pattern may include multiple dots, wherein the dots may also have any type of shape, e.g. linear, circular, elliptic, rectangular, any type of polygon, etc. The light pattern may have a regular pattern, e.g. of light dots, or it may have an irregular pattern, e.g. of light dots, i.e. the distances between areas with high(er) intensity of the pattern may be the same or at least (partially) similar (thereby forming a regular pattern) or the distances may be irregular, or even random (thereby forming an irregular pattern). Moreover, the areas having high(er) (or low(er)) intensity may have the same or similar size or they may have different sizes (or areas have partially the same size). Moreover, the intensity within one area or dot may vary, e.g. might be higher in the center and lower at the edge, etc., without limiting the present disclosure in that regard.

In some embodiments, the present disclosure is suitable for a time-of-flight based distance sensor for automotive, since, it may be robust for sunlight (strong ambient light) and may also be suitable for relatively long range detection. Thus, some embodiments, pertain The light emitting unit may include at least one (or more) light emitting elements, e.g., a laser element, a light emitting diode, or the like. The light emitting unit, e.g., the at least one laser element may include a vertical-cavity surface emitting laser. In some embodiments, each laser element includes one vertical-cavity surface emitting laser.

In some embodiments, the light emitting unit includes an array including multiple light emitting elements, such as laser elements (e.g. multiple vertical-cavity surface emitting lasers).

For instance, by controlling the array of light emitting elements, the light ray pattern can be emitted.

The light ray pattern can be predefined and may include any type of pattern. In some embodiments, the light ray pattern is a regular pattern, e.g., including multiple light dots (generally, dots may have any type of shape, e.g. linear, circular, elliptic, rectangular, any type of polygon, etc.) having the same or similar distance to each other. The light ray pattern may have a predefined border, e.g., rectangular, circular, elliptic, or the like.

In the following, for illustration purposes, also the term dots is used instead of light pattern for illustrating embodiments of the present disclosure, without limiting the present disclosure in that regard. Many different light ray patterns may be used in some embodiments, such as a raster of lines or curves for which spacing could be regular and/or orthogonal, or fully random, etc., and, thus, as discussed, the resulting light pattern may have also areas (light dots) having the form of, e.g., a raster of lines or curves, shapes (circular, elliptic, rectangular, polygon) for which spacing could be regular and/or orthogonal, or fully random, etc.

The light emitting unit may include at least one diffractive optical element for generating the light ray pattern.

Typically, the diffractive optical element includes a (diffraction) grating or the like for diffracting light in a predefined manner, or the diffractive optical element may also be achieved with a holographic or refractive optical element or the like.

In some embodiments, in order to focus the light ray pattern, (extra) lens elements before and/or after the diffractive optical element are provided in the lens portion. In some embodiments, a collimated light source is used with multiple sources, such as a VCSEL (vertical-cavity surface-emitting laser) laser, which only needs to be focused properly according to the present invention on the target. In some embodiments, a diffuse source, e.g. a LED source, is used, which is focused by using a lens (or multiple lenses), and then the light is passed through a diffractive optical element for generating the pattern, wherein a further focusing can be provided.

In some embodiments, multiple diffractive optical elements are provided for generating the light ray pattern.

In some embodiments, the light emitting unit is also configured to adapt the direction of the light rays of the light ray pattern. This can be achieved, for example, by adapting the orientation of the one or more diffractive optical elements, by adjusting the orientation of the light emitting elements, or the like. In some embodiments, the light emitting unit includes one or more piezoelectric elements for adjusting the direction of the emitted light ray pattern. The piezoelectric element(s) may adjust the direction and/or orientation of the light emitting elements and/or the diffractive optical element(s) and may thereby adjust the direction or orientation of the emitted light ray pattern.

In some embodiments, the lens portion includes at least one lens, which focusses the emitted light ray pattern to a light pattern (including, e.g. light dots) at the focal point. In some embodiments, the lens portion includes a lens system, which focusses the emitted light ray pattern to light dots at the focal point. The lens system may include a mixture of concave and convex lenses, wherein a concave lens has at least one concave side and a convex lens has at least one convex side.

The lens portion may include at least one liquid lens. In some embodiments, the liquid lens is positioned on top of a stiff lens, e.g., a lens made of plastic or glass. The liquid lens may be configured to amend the shape, e.g., upon application of an electric current, thereby, for example, the focal point and/or the direction of a light ray may be adjusted.

As discussed above, in some embodiments, the lens portion is configured to adapt the focal point, e.g., by moving one or more lenses, by adapting the shape of a liquid lens, by adjusting the distance of lenses in a lens system, etc.

Generally, in some embodiments, the lens portion is configured to adapt a light ray direction, such that, for example, the direction of the emitted light ray pattern and/or of each dot can be adjusted.

In some embodiments, the light emitting unit is further configured to adjust the intensity of the emitted light ray pattern. For instance, the light emitting unit includes one or more drivers for the light emitting elements, such that the intensity of all light emitting elements can be adjusted simultaneously or of one or more single light emitting elements, group of light emitting elements, etc.

The intensity may be adjusted upon a specific parameter, such as a distance which is to be measured, a mode in which the illumination device is driven (e.g. a close mode for measuring short distances, or a far mode for measuring long or far away distances, etc.).

In some embodiments, the intensity is adjusted together with the adjustable direction of the light rays of the light ray pattern. Thereby, a variable intensity pattern may be generated in the scene. This pattern may then be detected at the receiving side which may allow to further improve the device by performing, e.g., a structured light detection on this pattern.

Some embodiments pertain to a time-of-flight system including an illumination device for time-of-flight detection, as discussed above, which has a light emitting unit configured to emit a light ray pattern for generating a light pattern; and a lens configured to focus the emitted light ray pattern at a predefined focal point distant to the lens. The system additionally includes a time-of-flight sensor for detecting reflected light originating from the emitted light ray pattern.

The time-of-flight sensor may include a range imaging camera, as it is generally known, which may be based on charge-coupled device (CCD) technology, complementary metal oxide semiconductor (CMOS) technology, or the like. In some embodiments, the CMOS type sensor can be combined with the, generally known, Current Assisted Photonic Demodulator (CAPD) technology. The time-of-flight sensor may include an array of pixels, wherein each pixel includes one or more light detection elements. Each of the pixels may measure the time which the light has taken to travel from the light emitting unit to an object and back to the pixel, for example, or another roundtrip delay which is indicative of the distance between the object and system (i.e. the illumination device and/or the time-of-flight sensor).

In some embodiments, the light emitting unit of the time-of-flight system is further configured to change its focal distance. The focus distance of the emitted light ray pattern may be configured based on input parameters or a measured depth, wherein a circuitry of the time-of-flight system may be configured to configure (adjust) the focus distance of the emitted light ray pattern based on input parameters or a measured depth.

The time-of-flight system may further include a circuitry configured to analyze the reflected light detected by the time-of-flight sensor. The analysis may be done based on imaging data generated by the time-of-flight sensor and provided to the circuitry. The circuitry may include one or more processors, logical circuits, a memory (read only memory and/or random access memory), a storage (hard-disk), interface (network, wireless, infrared, etc.), and the like.

The analysis of the reflected light includes determining a light pattern or valleys in the reflected light. By determining the pattern, it is possible to determine the parts of an object which have reflected the emitted light pattern. As discussed, for example, the light pattern may include multiple light dots (or areas having higher light intensity), such that the reflected dots can be determined.

In some embodiments, the light pattern (e.g. dots) and valleys are detected, based on a threshold value. The threshold value can be adapted to a concrete embodiment. In some embodiments, that threshold is static, while in other embodiments, the threshold depends on one or more parameters, such as the intensity of the emitted light, ambient light, distance to the object, ratio of reflected light, etc.

Some embodiments pertain to a method for time-of-flight detection, including emitting a light ray pattern through a lens portion, thereby generating a light pattern (e.g. light dots, as discussed) at a predefined focal point at a predefined distance to the lens portion, and detecting reflected light originating from the emitted light ray pattern, as also discussed above.

The method may be performed by the circuitry of the time-of-flight system discussed herein and/or by a processor, microprocessor, computer, tablet pc, etc. As discussed above, the method may further include analyzing the reflected light, wherein analyzing the reflected light may include determining a light pattern (e.g. light dots) or valleys in the reflected light. As discussed, the dots and valleys may be detected, based on a threshold value. As discussed, the intensity of the emitted light ray pattern may be adjusted, wherein the adjustment of the intensity may be based on a calculated depth. Moreover, the method may include calculating the depth, based on the detected reflected light. Thereby the depth or distance to an object can be determined. Also the intensity may be modulated based on the direction, thereby generating a variable intensity pattern. By analyzing this pattern in the detected light, the quality of the depth may be improved by using structured light techniques.

Returning to FIG. 1, there is illustrated a first embodiment of an illumination device 1 for time-of-flight (TOF) detection. The illumination device 1 has a light emitting unit 2, which is based on a laser (e.g. a vertical cavity surface emitting laser). The light emitting unit 2 emits a laser ray 2a which incidents onto a diffractive optical element 3, which is configured based on a grating.

The diffractive optical element 3 generates a light ray pattern 4 by diffracting the laser ray 2a accordingly. As discussed above, in some embodiments, the diffractive optical element may be included in the lens portion and may also be able to focus the light ray pattern.

The light ray pattern 4 incidents onto a lens 5 of the illumination device 1 which forms a lens portion. The lens 5 is made of glass, and in this embodiment only one lens 5 is provided, which is a convex lens, such that the light ray pattern 4 travelling through the lens 5 is focused in focal point or focal plane 6, respectively, having a predefined distance (focal length) to the lens 5, as it is generally known in the field of optics. As discussed above, in some embodiments a focus adjustment before the diffractive optical element is provided, e.g., by providing also a lens (or multiple lenses) before the diffractive optical element (not shown). In some embodiments, the lens after the diffractive optical element may not be needed, e.g., depending on the exact requirements.

In the focal plane 6, the light rays of the light ray pattern 4 are focused to single dots 7 as is visualized in FIG. 1. The dots 7 are regularly distributed in a two-dimensional plane, as is illustrated in FIG. 1, and form thereby a light pattern. The dots 7 may have an equal vertical and/or horizontal distance to each other, without limiting the present disclosure in that regard.

In a plane 8, which is closer to the lens 5, i.e. between the lens 5 and the focal plane 6, the light ray pattern 4 is not focused, but diffused which results in a diffusion or diffused pattern 9 where, for example, light discs originating from the light ray pattern overlap each other. The diffusion may be provided naturally, for example, by the light emitting unit and/or by the diffractive optical element or the like.

Thus, depending on the distance to the lens 5, the light ray pattern 4 is either focused to dots 7, as it is the case for the focal plane 6, or it is diffused, such as it is the case on the plane 8 as can be seen by the diffusion pattern 9.

Figure 2:
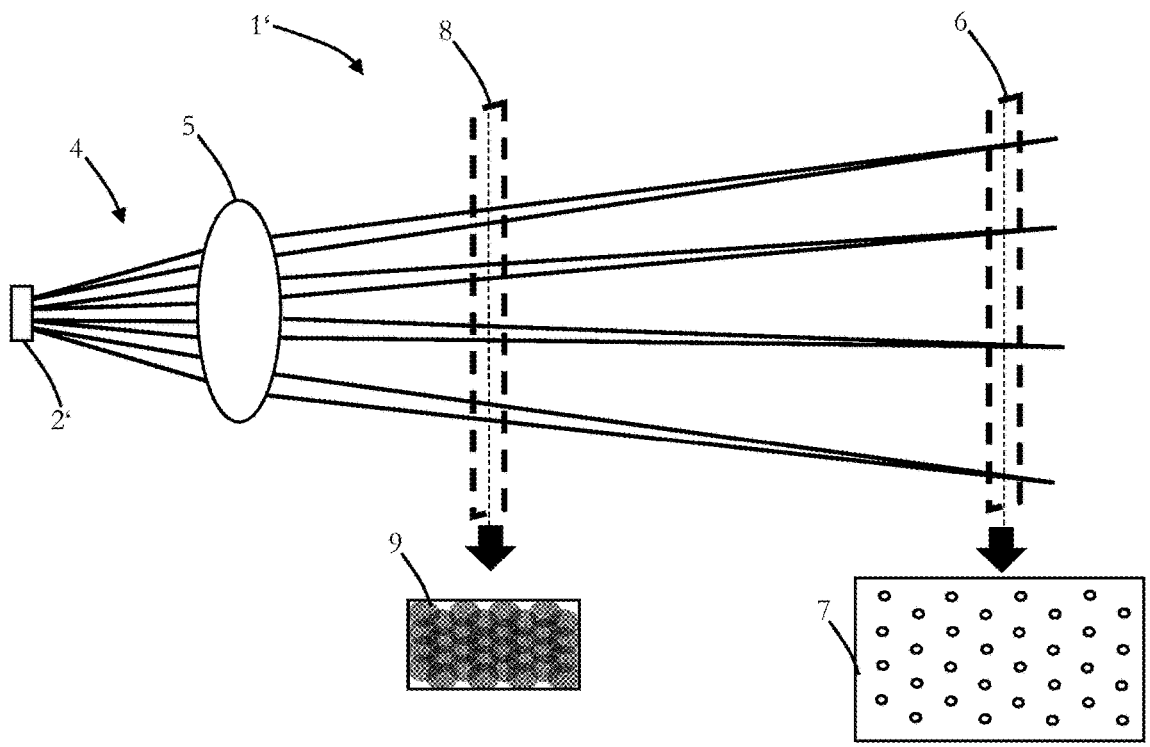
FIG. 2 illustrates a second embodiment of an illumination device for time-of-flight detection.

A second embodiment of an illumination device 1' is illustrated in FIG. 2, wherein parts, which are identical with those of the illumination device 1 of FIG. 1, are denoted with the same reference numbers.

The difference between the illumination device 1 of FIG. 1 and the illumination device 1' of FIG. 2 is the light emitting unit 2', which has an array of VCSEL laser elements which are able to generate the light ray pattern 4. In other words, in the embodiment of FIG. 2, the diffractive optical element 3 is not needed.

All other parts are identical to FIG. 1, i.e. the illumination device 1' has a lens 5 which focuses the light ray pattern 4 in the focal plane 6 for generating dots 7 and generates the light ray pattern 4, such that in plane 8 the diffusion pattern 9 is generated.

Figure 3:
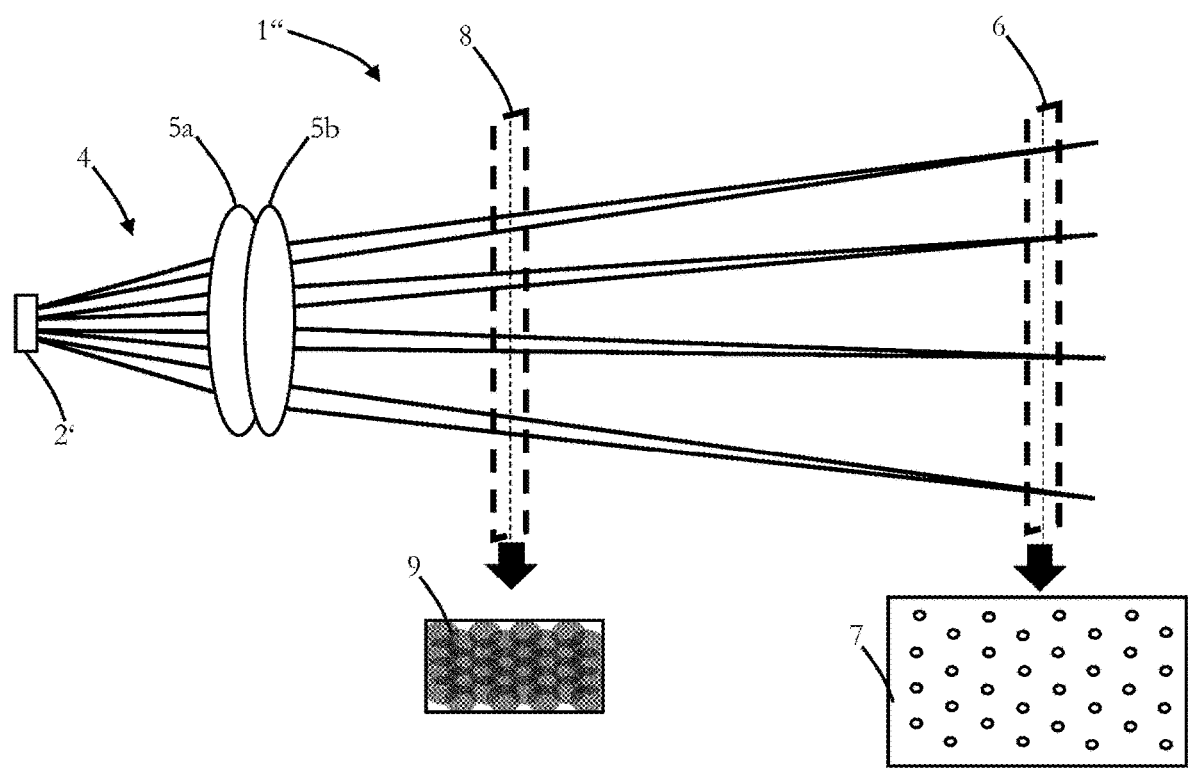
FIG. 3 illustrates a third embodiment of an illumination device for time-of-flight detection.

A third embodiment of an illumination device 1" is illustrated in FIG. 3, wherein parts, which are identical with those of the illumination device 1 of FIG. 1 or illumination device 1' of FIG. 2, are denoted with the same reference numbers.

The difference between the third embodiment of FIG. 3 (illumination device 1") and the second embodiment of FIG. 2 (illumination device 1') is that the illumination device 1" has two lenses in its lens portion, a first lens 5a which is a glass lens and focuses the light ray pattern 4 and a second lens 5b, which is a liquid lens and which is provided on top of the first lens 5a (on top of the surface of the lens 5a in the travel direction of the light rays).

By applying electric energy to the second lens 5b, the shape of the second lens 5b may be deformed such that the focal plane can be adjusted and/or the direction of the light ray pattern can be amended accordingly.

All other parts are identical to FIG. 1, i.e. the illumination device 1" has a light emitting unit 2' which generates the light ray pattern 4 which is focused by lenses 5a and 5b in the focal plane 6 for generating dots 7. The lenses 5a and 5b diffuse the light ray pattern, such that in plane 8 the diffusion pattern 9 is generated.

In other embodiments, as also discussed above, the lens portion may include multiple lenses (including liquid lenses), wherein the distance between one or more lenses can be adjusted for adapting the focal plane.

Figure 4:
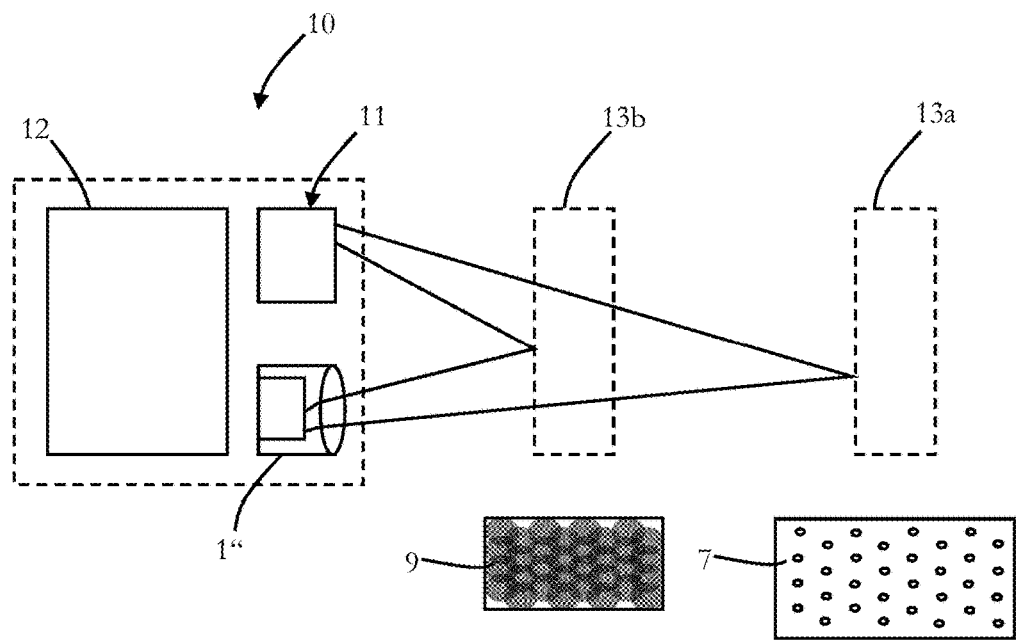
FIG. 4 illustrates an embodiment of a time-of-flight system including an illumination device, for example, according to FIG. 3.

An embodiment of a time-of-flight (TOF) system 10 is illustrated in FIG. 4.

The TOF system 10 has a light emitting unit, such as light emitting unit 1" of FIG. 3, and a TOF sensor 11. The TOF sensor 11 has multiple imaging elements (pixels) which can detect incoming light.

The TOF system 10 also has a circuitry 12, which includes a processor, storage, memory, etc., and which is connected to the TOF sensor 11 and the light emitting unit 1" and, thus, can control the TOF sensor 11 as well as the light emitting unit 1".

The circuitry 12 controls the light emitting unit 1" to emit the light ray pattern which is then reflected by an object, wherein FIG. 4 illustrates a first object 13a located in the focal plane (6, see FIG. 3) and a second object 13b, which is located in the plane 8 (see FIG. 3), where the light rays are diffused.

As is also illustrated in FIG. 4, on the object 13a the light dots 7 are projected, since the object 13a is in the focal plane. In contrast to this, on the object 13b, the diffusion pattern 9 is projected, since the object 13b is close or closer to the lens(es) of the light emitting unit 1" than the object 13a such that the light ray pattern is diffused by the lens(es) of the light emitting unit 1".

In both cases the light is reflected by the object, i.e. by the object 13a or by the object 13b. However, as the light ray pattern is diffused in the case of the object 13b, as can also be taken from the diffusion pattern 9 in FIG. 4, the object 13b is substantially uniformly illuminated. In contrast to this, as only the light dots 7 are projected onto the object 13a, which is in the focal plane, the object 13a is only illuminated in the regions of the dots 7.

The light of the light ray pattern illuminating the objects 13a and 13b is reflected back to the TOF system 10, such that the reflected light can be detected by the TOF sensor 11, as it is generally known (see also FIG. 4 where exemplary the path of one light ray hitting object 13a and the path of one light ray hitting object 13b is illustrated).

As discussed, the object 13b is illuminated by the diffusion pattern 9 such that a high resolution image of the object 13b can be taken or generated by the TOF sensor 11.

In contrast to this, the object 13a is only illuminated in the dot regions and, thus, only a low resolution image of the object 13a can be taken or generated by the TOF sensor 11.

In the case of the object 13a which is illuminated by dots 7, it is more difficult to get enough information, since only the dot regions are illuminated, and, thus, the image which is taken by the TOF sensor will include bright areas corresponding to the dot regions where the object 13a reflects the light and dark areas corresponding to the valley regions between the dot regions.

Hence, in some embodiments, the circuitry 12 is configured to differentiate dot regions and valley regions in the image data provided by the TOF sensor 11.

This can be done, for example, by a respective image analysis algorithm. For example, a threshold value can be defined, e.g. for the light intensity (brightness), such that regions which have a light intensity (brightness) above the threshold are identified as dot regions and regions having a light intensity (brightness) below the threshold (or below another threshold) are identified as valley regions. If information, for example, in-between dots is needed, this can be provided by performing an interpolation, e.g. between information gathered by one or more surrounding dots.

Moreover, in some embodiments, the circuitry 12 is configured to perform pattern recognition, for example, in order to detect dot and/or valley regions in the image data provided by the TOF sensor 11 in order to determine whether the image is taken from a close object, i.e. object 13b, or from an object in the focal plane, i.e. object 13a. Thereby, it can be detected whether a high resolution image or a low resolution image, or in-between, is included in the image data provided by the TOF sensor 11.

As discussed above, the light reflected by object 13b will generate a high resolution image, since the object 13b is illuminated with the diffusion pattern 9 such that the whole object 13b will be illuminated, while the light reflected by object 13a in the focal plane will generate a low resolution image, since basically only information from the dot regions on the object 13a can be obtained.

In some embodiments, as also discussed above, the focal plane can be adjusted. In such embodiments the circuitry 12 is configured to control the light emitting unit 1" accordingly, such that, for example, different focal planes at different distances to the TOF system 10 can be adjusted (e.g. 5 m, 10 m, 15 m, 20 m, etc., without limiting the present disclosure in that regard).

The circuitry 12 may control the light emitting unit 1" in dependence on one or more parameters to adjust the different focal planes, e.g. based on a velocity, e.g. in the case that the TOF is positioned on a car or other vehicle, in dependence on an object and or the depth/distance of the object which is detected, in dependence on an ambient light condition, etc.

As discussed above, the light emitting unit 1" is also able to adjust a direction of the emitted light rays. Hence, the circuitry 12 can be configured to control the light emitting unit 1" such that the light ray pattern direction is adjusted. For instance, in the case of the object 13a, which is in the focal plane and which is illuminated with dots 7, the resolution may be enhanced, by moving the dots across the object 13a, e.g. in the vertical and horizontal direction, in order to get more information, since a larger area of the object 13a can be thereby illuminated. The light ray pattern can also be moved and adjusted in its direction in such a way that a sub-pattern is projected onto the object 13a, e.g. a dot surrounded by a further number of dots (5, or the like). Thereby, the detection of the pattern on the object 13a in the image data provided by the TOF sensor 11 can be enhanced, since this specific pattern can be detected in the image data. Thereby, the accuracy of the depth/distance measurement may be enhanced.

Moreover, as discussed above, in some embodiments, the intensity of the light emitted by the light emitting unit (e.g. 1") can be adjusted. In some embodiments, a specific laser driver is provided in the light emitting unit and/or in the TOF system 10, which is able to control the intensity of the light.

The circuitry 12 may be configured to control the laser driver, such that the intensity of the light emitted by the light emitting unit, such as light emitting unit 1", can be adjusted.

The light intensity may be adjusted, based on at least one parameter, such as the distance (high or low resolution image), the focal plane etc. Moreover, the light intensity may also be used for generating a specific pattern, in particular for the object 13a in the focal plane. For instance, the dots 7 may include high intensity and low intensity dots or a pattern is generated, e.g. together with the light ray direction adjustment, as discussed further above. Generating of specific patterns may increase the accuracy of the depth/distance measurement, since in particular for the low resolution image data (generated by light reflected by object 13a illuminated by dots 7), the detectability of such a pattern may be improved and, if desired, structured light algorithms can be applied to further improve accuracy.

In some embodiments, for example, for each change of direction of the light ray pattern also the intensity may be changed, whereby an easy detectable pattern may be generated.

Figure 5:
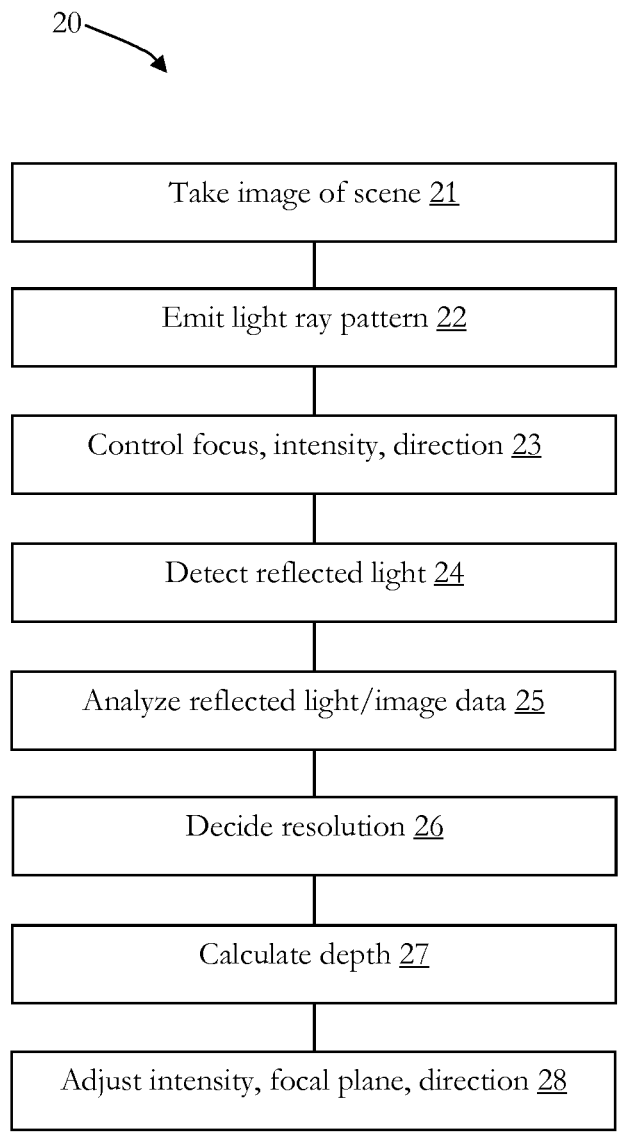
FIG. 5 shows a flowchart of a method for time-of-flight detection, which, for example, can be performed by the time-of-flight system of FIG. 4.

In the following, a method 20 for TOF detection, which may be performed by the TOF system 10, e.g. its circuitry 12, is explained under reference of FIG. 5.

At 21, the circuitry 12 controls the TOF sensor 11 to take image data. The start of taking image data may coincide with 22, where the scene is illuminated. In some embodiments, the scene is also illuminated in accordance with a modulation frequency, and the circuitry takes image data accordingly.

At 22, the circuitry 12 controls the light emitting unit 1" to emit a light ray pattern to the scene, as discussed above, which is focused in the focal plane as dots, as discussed above.

At 23, the circuitry 12 may control the focus where the light ray pattern is focused (i.e. focal length), the intensity and/or the direction of the light ray pattern as discussed above.

The emitted light ray pattern may be reflected by an object in the scene, such as object 13a and/or 13b, as discussed above.

Then at, 24, the method detects the light which is reflected by, for example, the object, which is illuminated by the light ray pattern. The reflected light is detected with the TOF sensor 11, which generates image data accordingly.

At 25, the reflected light, i.e. the image data generated by the TOF sensor 11, is analyzed, and it is determined, for example, whether dots/valleys can be found or not. As discussed, the dots/valleys may be detected based on a threshold value (or on two or more threshold values, e.g. for dots, dark areas, middle dark areas between the dots, etc.).

At 26, it is decided, whether the image data represents a low resolution image, e.g. of an object in the focal plane, or a high resolution image of an object which is illuminated with the diffused light ray pattern.

If a low resolution image is detected, as discussed above, interpolation may be performed in order to improve the image quality of the low resolution image.

At 27, a depth or distance is calculated, based on the reflected light detected by the TOF sensor 11, as it is generally known (e.g. the calculation is based on the roundtrip delay of the light emitted from the light emitting unit, reflected by the object and detected by the TOF sensor).

At 28, the intensity (and/or the direction and/or the focal plane), may be adjusted, for example, based on the calculated depth, as also discussed above.

Thereafter, the method may start at 21 again.

It should be recognized that the embodiments describe methods with an exemplary ordering of method steps. The specific ordering of method steps is however given for illustrative purposes only and should not be construed as binding. For example the ordering of 26 and 27 and/or 28 may be exchanged or steps could be omitted, for example step 23 could be omitted.

Please note that the control/circuitry 12 may be divided into subunits and that the present disclosure is not limited to any specific division of functions in specific units.

The methods as described herein are also implemented in some embodiments as a computer program causing a computer and/or a processor and/or a circuitry to perform the method, when being carried out on the computer and/or processor and/or a circuitry. In some embodiments, also a non-transitory computer-readable recording medium is provided that stores therein a computer program product, which, when executed by a processor and/or circuitry, such as the processor and/or circuitry described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An illumination device for time-of-flight detection, comprising:
  a light emitting unit configured to emit a light ray pattern for generating a light pattern; and
  a lens portion configured to focus the emitted light ray pattern at a predefined focal point at a predefined distance to the lens portion for generating the light pattern.
(2) The illumination device of (1), wherein the light emitting unit includes at least one diffractive optical element for generating the light ray pattern.
(3) The illumination device of (1) or (2), wherein the light emitting unit includes at least one laser element.
(4) The illumination device of (3), wherein the at least one laser element includes a vertical-cavity surface emitting laser.
(5) The illumination device of anyone of (3) or (4), wherein the light emitting unit includes a plurality of laser elements, which are arranged in an array.
(6) The illumination device of anyone of (1) to (5), wherein the lens portion includes a lens system.
(7) The illumination device of anyone of (1) to (6), wherein the lens portion includes at least one liquid lens.
(8) The illumination device of anyone of (1) to (7), wherein the lens portion is configured to adapt a light ray direction.
(9) The illumination device of anyone of (1) to (8), wherein the light emitting unit is further configured to adjust the intensity of the emitted light ray pattern.
(10) A time-of-flight system comprising:
  an illumination device for time-of-flight detection, including:
    a light emitting unit configured to emit a light ray pattern for generating a light pattern; and
    a lens configured to focus the emitted light ray pattern at a predefined focal point distant to the lens; and
  a time-of-flight sensor for detecting reflected light originating from the emitted light ray pattern.
(11) The time-of-flight system of (10), wherein the light emitting unit is further configured to change its focal distance.
(12) The time-of-flight system of (11), wherein the focus distance of the emitted light ray pattern is configured based on input parameters or a measured depth.
(13) The time-of-flight system of anyone of (10) to (12), further comprising a circuitry configured to analyze the reflected light detected by the time-of-flight sensor.
(14) The time-of-flight system of (13), wherein the analysis of the reflected light includes determining a light pattern or valleys in the reflected light.

(15) The time-of-flight system of (14), wherein the light pattern and valleys are detected, based on a threshold value.

(16) A method for time-of-flight detection, comprising:
emitting a light ray pattern through a lens portion, thereby generating a light pattern at a predefined focal point at a predefined distance to the lens portion;
and detecting reflected light originating from the emitted light ray pattern.

(17) The method of (16), further comprising analyzing the reflected light.

(18) The method of (17), wherein analyzing the reflected light includes determining a light pattern or valleys in the reflected light.

(19) The method of (18), wherein the light pattern and valleys are detected, based on a threshold value.

(20) The method of anyone of (16) to (19), further comprising adjusting the intensity of the emitted light ray pattern.

(21) The method of (20), wherein the intensity is adjusted based on a calculated depth.

(22) The method of (20) or (21), wherein the intensity is adjusted together with the light ray direction

(23) The method of (21) or (22), further comprising calculating the depth, based on the detected reflected light.

(24) A computer program comprising program code causing a computer to perform the method according to anyone of (16) to (23), when being carried out on a computer.

(25) A non-transitory computer-readable recording medium that stores therein a computer program product, which, when executed by a processor, causes the method according to anyone of (16) to (23) to be performed.

The invention claimed is:

1. An illumination device for time-of-flight detection, comprising: a light emitting unit configured to emit a light ray pattern for generating a light pattern; and a lens portion configured to focus the emitted light ray pattern at a predefined focal point at a predefined distance to the lens portion for generating the light pattern,
wherein the light ray pattern includes dots;
wherein the lens portion is further configured to adjust the predefined focal point to an adjusted focal point in response to information received about a current distance;
wherein the light emitting unit is further configured to adjust an intensity of the light ray pattern in response to the information received about the current distance; and
wherein the current distance is determined based, at least in part, on detected reflected light from the light ray pattern.

2. The illumination device of claim 1, wherein the light emitting unit includes at least one diffractive optical element for generating the light ray pattern.

3. The illumination device of claim 1, wherein the light emitting unit includes at least one laser element.

4. The illumination device of claim 3, wherein the at least one laser element includes a vertical-cavity surface emitting laser.

5. The illumination device of claim 3, wherein the light emitting unit includes a plurality of laser elements, which are arranged in an array.

6. The illumination device of claim 1, wherein the lens portion includes a lens system.

7. The illumination device of claim 1, wherein the lens portion includes at least one liquid lens.

8. The illumination device of claim 1, wherein the lens portion is configured to adapt a light ray direction.

9. A time-of-flight system, comprising: an illumination device for time-of-flight detection, including: a light emitting unit configured to emit a light ray pattern for generating a light pattern; and a lens configured to focus the emitted light ray pattern at a predefined focal point distant to the lens; and a time-of-flight sensor for detecting reflected light originating from the emitted light ray pattern,
wherein the light ray pattern includes dots; and
wherein the illumination device is configured to adjust one or more of: an intensity of the emitted light ray pattern, a direction of the emitted light ray pattern, or a focal distance of the system in response to information about the reflected light from the time-of-flight sensor.

10. The time-of-flight system of claim 9, wherein the focal distance of the emitted light ray pattern is configured based on input parameters or a measured depth.

11. The time-of-flight system of claim 9, further comprising a circuitry configured to analyze the reflected light detected by the time-of-flight sensor.

12. A method for time-of-flight detection, comprising: emitting a light ray pattern through a lens portion, thereby generating a light pattern at a predefined focal point at a predefined distance to the lens portion; detecting reflected light originating from the emitted light ray pattern, wherein the light ray pattern includes dots; adjusting the predefined focal point to an updated focal point in response to at least one attribute of the detected reflected light; and adjusting an intensity of the light ray pattern in response to at least one attribute of the detected reflected light.

13. The method of claim 12, further comprising analyzing the reflected light.

14. The method of claim 13, wherein analyzing the reflected light includes determining a light pattern or valleys in the reflected light.

15. The method of claim 14, wherein the light pattern and valleys are detected, based on a threshold value.

16. The method of claim 12, wherein the intensity is adjusted together with the light ray direction.

17. The method of claim 16, further comprising calculating a depth, based on the detected reflected light.

18. The method of claim 17, wherein the at least one attribute of the detected reflected light comprises the calculated depth.

* * * * *